(12) United States Patent
Van Mill et al.

(10) Patent No.: US 9,723,789 B2
(45) Date of Patent: *Aug. 8, 2017

(54) CART WITH FOLDING AUGER HAVING ADJUSTABLE ELEVATION

(71) Applicant: Unverferth Manufacturing Company, Inc., Kalida, OH (US)

(72) Inventors: Michael D. Van Mill, Shell Rock, IA (US); Ronald J. Schlimgen, Shell Rock, IA (US)

(73) Assignee: Unverferth Manufacturing Company, Inc., Kalida, OH (US)

(*) Notice: Subject to any disclaimer, the term of this patent is extended or adjusted under 35 U.S.C. 154(b) by 123 days.

This patent is subject to a terminal disclaimer.

(21) Appl. No.: 14/231,166

(22) Filed: Mar. 31, 2014

(65) Prior Publication Data

US 2014/0294548 A1    Oct. 2, 2014

Related U.S. Application Data

(63) Continuation of application No. 13/190,311, filed on Jul. 25, 2011, now Pat. No. 8,702,368.

(51) Int. Cl.
*A01D 90/10* (2006.01)
*B60P 1/42* (2006.01)

(52) U.S. Cl.
CPC ............ *A01D 90/10* (2013.01); *B60P 1/42* (2013.01)

(58) Field of Classification Search
CPC ........ B60P 1/42; A01D 41/1217; A01D 90/10
USPC .............................. 198/318, 550.1, 659, 668
See application file for complete search history.

(56) References Cited

U.S. PATENT DOCUMENTS

| | | | | |
|---|---|---|---|---|
| 2,380,840 A | * | 7/1945 | Hanna | F23K 3/04 110/105.5 |
| 3,014,575 A | * | 12/1961 | Klein | B65G 33/32 198/659 |
| 3,035,682 A | * | 5/1962 | Ferch | B65G 11/106 193/25 R |
| 3,100,052 A | * | 8/1963 | Brembeck | B65G 65/46 198/550.2 |
| 3,175,676 A | * | 3/1965 | Vander Schaaf | B65G 67/24 198/550.1 |
| 3,198,314 A | | 8/1965 | Duram | |
| 3,773,164 A | | 11/1973 | Bradley | |

(Continued)

OTHER PUBLICATIONS

Unverferth Manufacturing Co., Inc., Brochure "Reach Up. Reach OUT!" 2009.

*Primary Examiner* — James Keenan
(74) *Attorney, Agent, or Firm* — Rothwell, Figg, Ernst & Manbeck, P.C.

(57) ABSTRACT

A cart having an adjustable elevation auger. A junction box may located within the opening of a sump of a bin of a cart. The junction box may have an open top, closed bottom and sides, and back wall. The back wall of the junction box may be secured to a bin wall by a hinge such that the junction box may pivot about a pivot axis. An auger housing may be connected to and extend from the junction box. An auger may extend through the auger housing and have an intake end disposed within the junction box. The auger housing and auger may pivot with the junction box about a pivot axis between a lowered position and an elevated position. The auger may be a corner auger and may be a folding auger.

20 Claims, 6 Drawing Sheets

(56) References Cited

U.S. PATENT DOCUMENTS

| | | | | |
|---|---|---|---|---|
| 4,119,223 A | * | 10/1978 | Fiechter | B60P 1/40 198/317 |
| 4,218,169 A | * | 8/1980 | Arends | B60P 1/40 414/523 |
| 4,411,581 A | | 10/1983 | Niewold | |
| 4,923,358 A | * | 5/1990 | Van Mill | B60P 1/42 198/532 |
| 4,989,716 A | * | 2/1991 | Stuckey | B65G 33/32 198/311 |
| 5,409,344 A | | 4/1995 | Tharaldson | |
| 5,516,253 A | | 5/1996 | Linscheid | |
| 5,538,388 A | * | 7/1996 | Bergkamp | B60P 1/42 414/523 |
| 5,655,872 A | * | 8/1997 | Plotkin | B60P 1/40 198/313 |
| 5,733,094 A | * | 3/1998 | Bergkamp | B60P 1/40 414/502 |
| 5,788,055 A | * | 8/1998 | Stewart | B65G 33/32 198/670 |
| 5,980,189 A | | 11/1999 | Rubner | |
| 6,017,182 A | * | 1/2000 | Grieshop | B60P 1/42 198/550.1 |
| 6,042,326 A | | 3/2000 | Thomas et al. | |
| 6,209,880 B1 | * | 4/2001 | Turnwald | B60P 1/42 198/671 |
| 6,497,546 B2 | * | 12/2002 | Wood | B60P 1/42 198/536 |
| 6,767,174 B2 | | 7/2004 | Cresswell | |
| 7,381,131 B1 | | 6/2008 | Harpole | |
| 7,393,275 B2 | * | 7/2008 | Voss | A01D 41/1217 414/526 |
| 7,690,499 B2 | * | 4/2010 | Smith | B65G 15/08 198/690.2 |
| 2010/0209223 A1 | * | 8/2010 | Van Mill | B60P 1/42 414/526 |
| 2010/0254792 A1 | | 10/2010 | Kinzenbaw | |
| 2013/0259615 A1 | | 10/2013 | Van Mill et al. | |

* cited by examiner

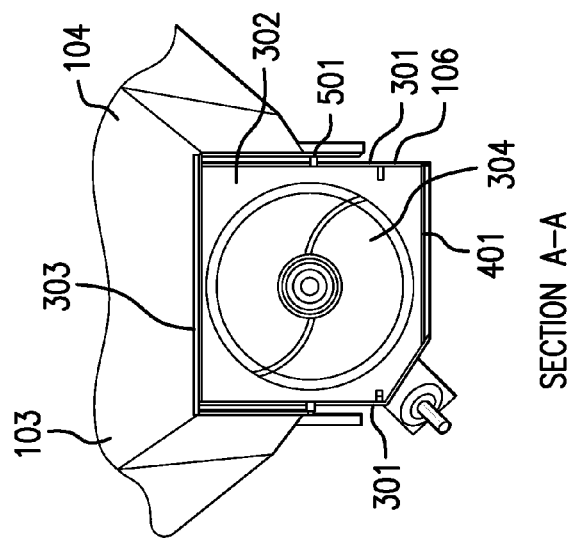
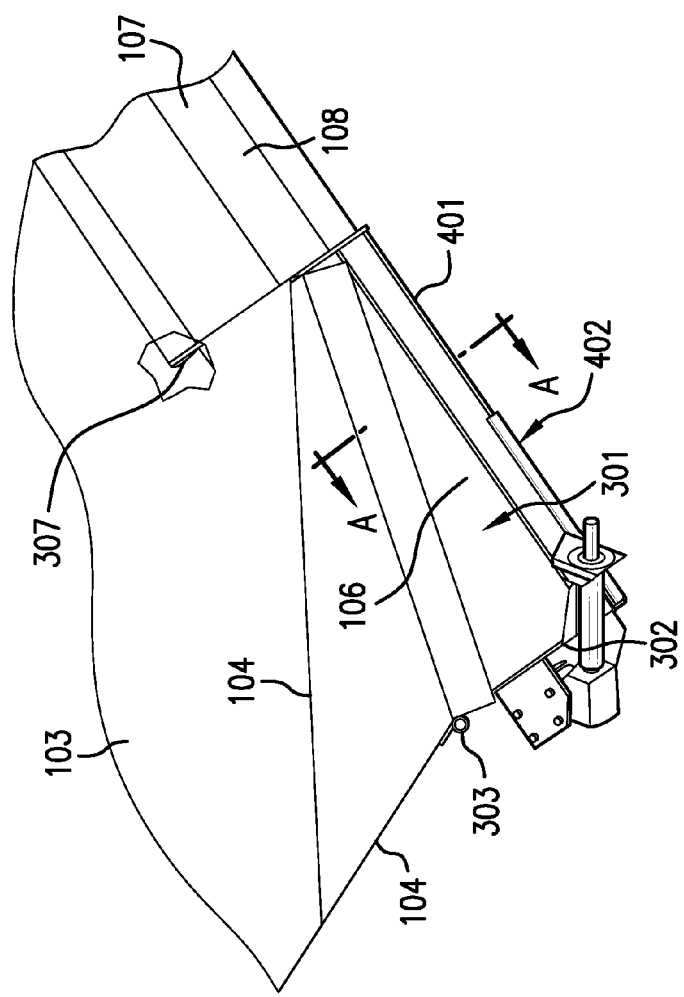

CART WITH FOLDING AUGER HAVING ADJUSTABLE ELEVATION

CROSS-REFERENCE OF THE APPLICATION

The present application is a continuation of U.S. patent application Ser. No. 13/190,311 filed Jul. 25, 2011, now U.S. Pat. No. 8,702,368, which is incorporated herein by reference in its entirety.

BACKGROUND OF THE INVENTION

I. Field of the Invention

The present invention is generally directed to carts and specifically directed to a cart with an auger having adjustable elevation.

II. Description of the Related Art

Carts, such as grain carts, shorten harvesting time by improving the efficiency of harvesting equipment such as combines. Carts may be used to transport grain from harvesters or combines in the field to grain trucks or bins at the side of the field. Carts are needed because grain bins are immobile, and grain trucks often do not perform well in muddy or rough field conditions and have the potential to spark fires in dry fields. Carts usually comprise a bin (i.e., hopper or box) sitting atop a wheeled frame in combination with an auger means or mechanism for unloading grain from the bin. Carts handle soft or rough fields with ease and are typically drawn by a tractor alongside a combine, which unloads its contents into the cart. Carts enable a combine to continue to harvest while unloading the grain into the cart. This grain unloading method increases productivity dramatically because combines need never stop to unload. In addition, it is not necessary for the combines themselves to travel to grain trucks or bins at the side of the field each time the combine is full. After a cart is loaded with grain or other material by one or more combines, the grain is unloaded from the cart into a bin for temporary storage or into a waiting grain truck for transport to another location, such as a grain elevator. Because carts offer a combination of economy, versatility, production savings, and maneuverability, carts have been widely accepted by farmers and widely produced by equipment manufacturers.

Carts capable of unloading grain directly into a grain truck or bin use a conveyor to do so. Often the conveyor is an auger. Various auger configurations are known. Auger structures can be contained inside the hopper structure or be located entirely outside of it. Auger configurations can have a single auger or multiple augers. The auger structure can be located at the front, side, back or corner of the cart.

In auger configurations having an auger that extends through the hopper such that there is an auger structure contained inside the hopper structure, grain removal from the hopper can be significantly impaired because internal auger structures hinder downward grain flow, leak grain into the sump causing a high start-up torque, and lessen the depth of the hopper sump area. Therefore, it is desirable that the auger structure is located entirely outside of the hopper.

A double auger configuration has a lower auger and an upper auger. The lower auger receives material from the hopper and deposits it into the upper hopper. The upper auger then carries the material received from the lower auger and deposits it into a trailer, such as a grain trailer. Even triple auger configurations are known having, for example, a lower, horizontally disposed drag auger, a vertically disposed lift auger, and an upper, horizontally disposed discharge auger. However, these plural auger configurations suffer from the disadvantage of increased complexity and cost resulting from the increased number of moving parts and required maintenance. In addition, the likelihood that the material will damaged is increased with each auger.

Carts having a single auger configuration are also known. Compared to multiple auger configurations, single auger configurations are desirable because they are less complex and cause less damage to the grain or other material. One type of single auger configuration is a corner auger. A corner auger extends outwards and upwards from the lowermost portion of the hopper along the corner of the hopper. A folding, corner auger has a retractable section that can be pivoted to a compact, folded position during non-use or travel and to an extended, unfolded position during use. If the retractable section is located at the front of the hopper in its compact, folded position, an operator of the cart can easily view whether the retractable section of the auger is in its compact, folded position or in its extended, unfolded position.

In many prior art carts, the height at which material was discharged could not be adjusted to accommodate trailers, trucks and bins of different heights. As a result, these carts could either be incompatible with tall containers or designed to accommodate the highest container. But, when such a grain cart is used with a shorter container, a gap between the dispensing end of the auger and the container is created. Because material, such as grain, is often light and susceptible to being blown away in windy conditions, the gap increases the amount of material which spills from the auger while attempting to unload the material into the container. Therefore, it is desirable for the elevation at which a cart discharges material to adjustable.

Carts with adjustable discharge elevation are known. Some carts relied on belt conveyors instead augers to discharge material at an adjustable elevation. However, augers are preferred to other types of conveyors, including belt conveyors, because of their simplicity, low cost, durability and versatility. Further, while other types of conveyors are unable to convey material at steep angles, auger operation can continue at any angle.

Carts having adjustable elevation augers are also known. Conventional adjustable elevation augers are often implemented using double augers by using a stationary or fixed lower auger in combination with a moveable upper auger. The stationary lower auger can easily be sealed to prevent material leakage from the hopper, but the range of auger is limited due to the lower portion of the auger assembly being stationary.

Thus, there remains a need for a cart having an auger, and preferably a corner auger, with adjustable elevation that can efficiently unload material without leakage.

SUMMARY OF THE INVENTION

The present invention succeeds where others have failed by providing a grain cart having a sealed corner auger with adjustable elevation. The result is a grain cart having all the advantages of corner augers and adjustable elevation. Not only is less grain damaged and more grain visibility provided, but less grain is lost.

An aspect of the invention is a cart having a frame, a bin, a junction box, an auger housing, an auger and a lift assembly. The frame is supported on a plurality of wheels. The bin is supported on the frame and includes a plurality of bin walls defining a storage space converging at a sump opening at a bottom of the bin. The junction box is mounted to pivot within the sump opening about a pivot axis. The auger housing connected to and extending from the junction box. The auger extends through the auger housing and has an intake end disposed within the junction box. The lift assembly is connected with the auger housing and movable to cause the auger housing to pivot with the junction box about the pivot axis between a lowered position and an elevated position.

In some embodiments, the auger housing may extend upwardly from the junction box along a corner of the bin. The pivoting junction box may include an open top. The pivoting junction box may further include a closed bottom and sides, and a back wall pivotally secured to the bin. The intake end of the auger is rotatably secured to the back wall of the pivoting junction box. The cart may have a hinge that pivotally secures a top edge of the back wall to the bin. The cart may have an elastic seal member disposed within a gap between a side of the junction box and the bin. The cart may have a plurality of elastic seal members disposed in a plurality of gaps between opposite sides of the junction box and the bin. The cart may have a pair of seal support plates extending away from the back wall of the junction box on opposite sides of the junction box, and, for each pair of seal support plates, at least one of the plurality of elastic seal members may extend along the bin in parallel with the seal support plates. Each of the plurality of seal members may be biased toward the junction box using one or more springs. The springs may be one of helical coil springs and leaf springs. The cart may have a flap mounted on a second bin wall and extending into the pivoting junction box to guide material in the bin into the pivoting junction box. The flap may include a top edge attached to the second bin wall and a free bottom edge. The flap may include wings extending from side edges of the flap. The wings may have a triangular shape. The wings may extend perpendicular to a planar surface of the flap.

In some embodiments, the auger housing may include a lower auger housing and an upper auger housing. The lower auger housing may be pivotally secured to the upper auger housing such that the upper auger housing is pivotable between an extended position, in which the upper auger housing is substantially in alignment with the lower auger housing, and a retracted position, in which the upper auger housing extends along an outer surface of the bin. The lower auger housing may include a flange that connects the lower auger housing to the pivoting junction box. The cart may include a flap extending from the bin to an upper edge of the flange. The upper edge of the flange may be configured to slide against the flap as the junction box pivots. The flap may be sufficiently stiff to prevent being pushed, by the weight of material flowing from the bin into the pivoting junction box, over the flange but flexible enough to move with the flange as the elevation of the auger is adjusted. The flap may be a rubber flap. The rubber flap may be made of masticated rubber.

In some embodiments, the lift assembly may include a piston. The cart may be configured to be pulled by a tractor, and the piston may be configured to be controlled remotely from a cab of the tractor. The piston may be connected between the frame and the auger housing. The piston may be connected between the bin and the auger housing.

In some embodiments, the bin may be configured to hold grain. An elevation of the discharge end of the auger may be adjustable from about 126 inches in a lowered position to about 161 inches in an elevated position. The junction box may include a clean out door.

Other features and advantages of the invention will become apparent to those of skill in the art upon reviewing the following detailed description of the preferred embodiments and the accompanying drawings.

BRIEF DESCRIPTION OF THE DRAWINGS

The accompanying drawings, which are incorporated herein and form part of the specification, illustrate a preferred embodiment of the present invention and, together with the detailed description, further serve to explain the principles of the invention and to enable a person skilled in the art to make and use the invention. In the drawings, like reference numbers are used to indicate identical or functionally similar elements. Additionally, the left-most digit(s) of the reference number identifies the drawing in which the reference number first appears.

FIG. 4 is side view of a pivoting junction box, auger, auger housing and bin of a cart according to an embodiment of the invention.

FIG. 5 is a cross-sectional view of a pivoting junction box, auger, auger housing, bin and elastic seal member of a cart to an embodiment of the invention.

DETAILED DESCRIPTION OF THE PREFERRED EMBODIMENTS

Figure 1A:
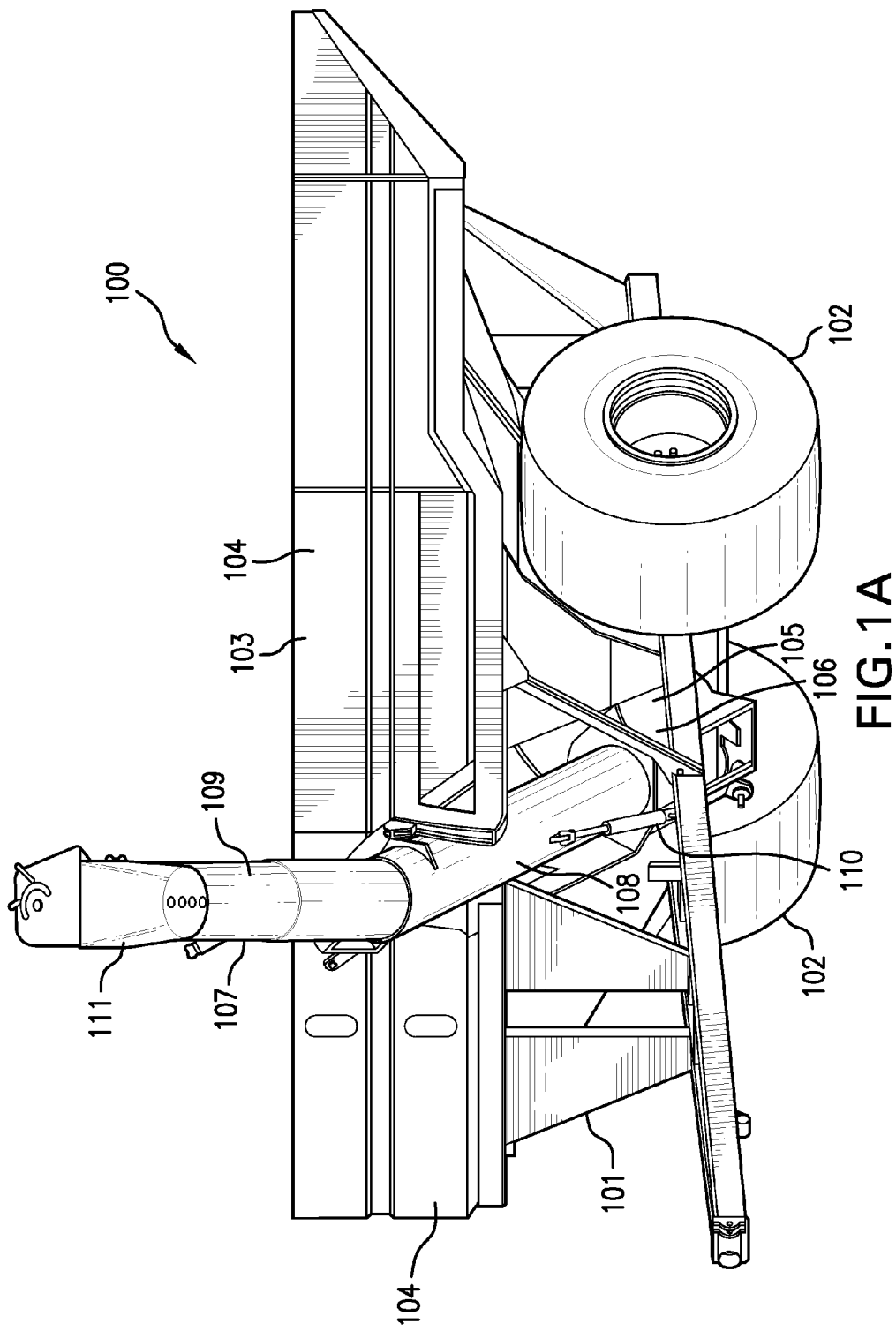
FIG. 1A is a corner view of a cart with an adjustable elevation auger in its elevated position according to an embodiment of the invention.
Figure 1B:
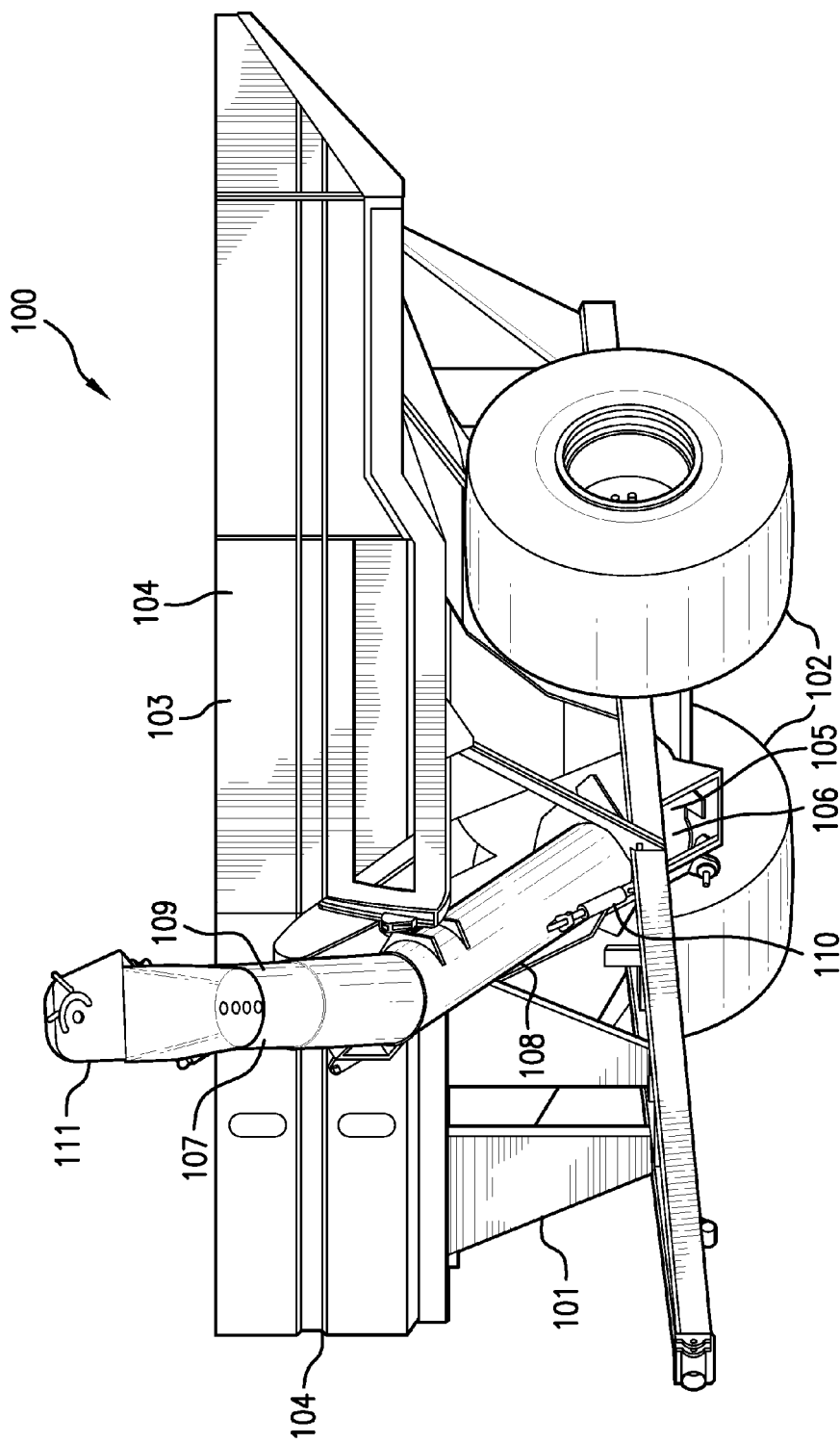
FIG. 1B is a corner view of a cart with an adjustable elevation auger in its lowered position according to an embodiment of the invention.

FIGS. 1A and 1B illustrate a grain cart 100 according to one embodiment of the present invention. Cart 100 has a frame 101 supported by a plurality of wheels 102. Frame 101 supports a bin 103 having a plurality of bin walls 104. The bin walls 104 define a storage space converging at the opening of a sump 105. A junction box 106 is pivotally mounted to bin 103 at the opening of sump 105. An auger housing 107 is connected to and extends upwardly from pivoting junction box 106 along a corner of bin 103.

The auger housing 107 has a lower auger housing 108 and an upper auger housing 109. Lower auger housing 108 is pivotally secured to upper auger housing 109 such that the upper auger housing is pivotable between an extended position, in which said upper auger housing is substantially in alignment with said lower auger housing, and a retracted position, in which said upper auger housing folds along an outer surface of bin 103. For example, in the retracted position, the upper auger housing may be disposed along the outer surface of the outer surface of bin 103 in a substantially horizontal direction.

Figure 2:
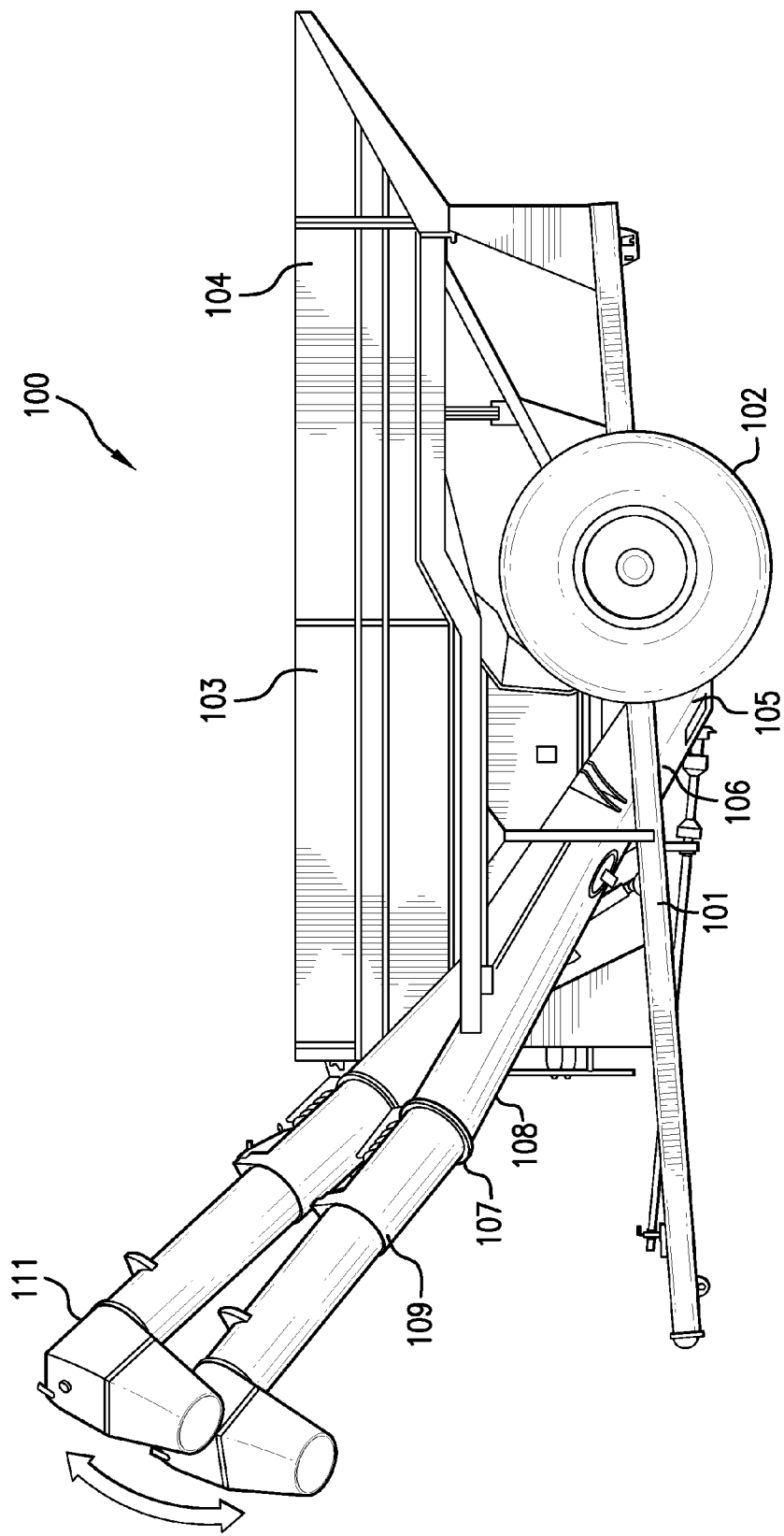
FIG. 2 is a side view of a cart with an adjustable elevation auger showing the adjustable elevation auger in both its elevated and lowered positions according to an embodiment of the invention.

A lift assembly 110 is connected between auger housing 107 and frame 101 and is movable to cause the auger housing 107 to pivot with pivoting junction box 106 between an elevated position, as shown in FIG. 1A, and a lowered position, as shown in FIG. 1B. Furthermore, FIG. 2 illustrates a side view of the cart 100 with the auger housing 107 both in its elevated and lower positions. Lift assembly 110 may include, for example, a piston.

Cart 100 may be configured to be pulled by a tractor, and lift assembly 110 may be configured to be controlled remotely from a cab of the tractor. Bin 103 may be configured to hold material, such as grain or seed.

Figure 3:
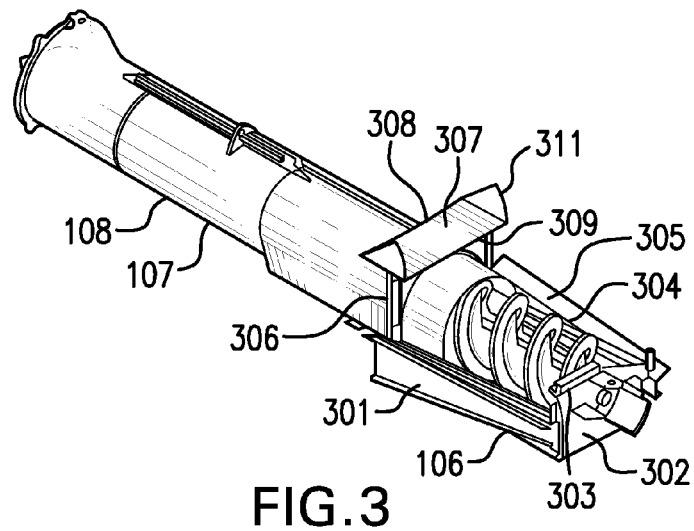
FIG. 3 is a perspective view of a pivoting junction box, auger, auger housing and flap of a cart according to an embodiment of the invention.

FIGS. 3-5 illustrate the details of pivoting junction box 106, sump 105 and auger housing 107 of cart 100 having an adjustable elevation auger according to an embodiment of the invention. Pivoting junction box 106 includes a closed bottom 401, sides 301 and a back wall 302. Pivoting junction box 106 also includes an open top. The open top of pivoting junction box 106 is located at the opening of sump 105. Junction box 106 is pivotally secured to bin 103 via a hinge 303. For example, hinge 303 may pivotally secure a top edge of back wall 302 of junction box 106 to bin 103.

An auger 304 extends through auger housing 107. Auger 304 has an intake end 305 disposed within pivoting junction box 106 at the opening of sump 105. Intake end 305 of auger 304 is rotatably secured to back wall 302 of pivoting junction box 106.

Lower auger housing 109 of auger housing 107 includes a flange 306 that connects lower auger housing 109 to pivoting junction box 106. A flap 307 extends from bin 103 to an upper edge of flange 306. Flap 307 may be mounted on a bin wall of the plurality of bin walls 104. Flap 307 includes a top edge 308 attached to the bin wall and a free bottom edge 309. The top edge 308 of flap 307 can be attached to bin 103 using any suitable fasteners, which may include rivets and/or bolts. Flap 307 also includes side edges 310 and may include wings 311 extending from side edges 310. Wings 311 may have a triangular shape and may extend perpendicular to a planar surface of flap 307.

Flap 307 extends into pivoting junction box 106 to guide material in bin 103 into the pivoting junction box 106. The upper edge of flange 306 is configured to slide against flap 307 as junction box 106 pivots. Lower auger housing 108 may be offset from the center of flange 306 to ensure overlapping contact between flap 307 and flange 306 when the auger housing 107 is in the elevated position and slight overlap in the lowered position. Flap 307 is configured to be sufficiently stiff to prevent being pushed, by the weight of material flowing from bin 103 into pivoting junction box 106, over flange 306 but flexible enough to move with flange 306 as the elevation of auger 304 is adjusted. For example, flap 307 may be a rubber flap, and, more particularly, may be made of masticated rubber. However, flap 307 may be constructed of any suitable material.

On each of the opposite sides of pivoting junction box 106, a gap exists between side 301 and bin 103. Seal members 501 are disposed in the gaps between sides 301 of junction box 106 and bin 103. For example, a first elastic seal member 501 may be disposed between one of sides 301 and bin 103, and second elastic seal member 501 may be disposed between the other of sides 301 and bin 103

Figure 6A:
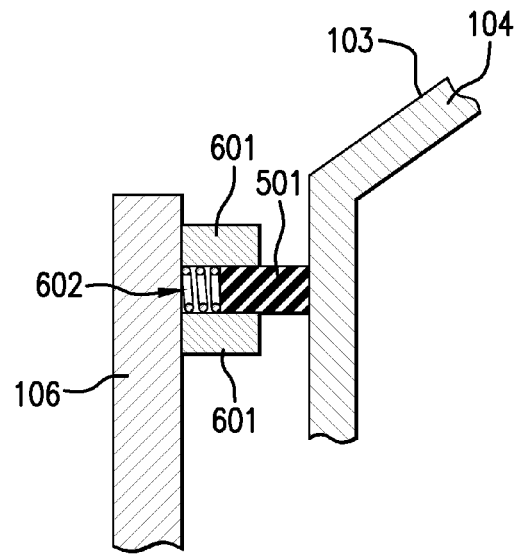
FIGS. 6A, 6B and 6C are cross-sectional views of a pivoting junction box, bin and elastic seal member according to an embodiment of the invention and respectively show the elastic seal member when the auger is an intermediate position, elevated position and lowered position.
Figure 6B:
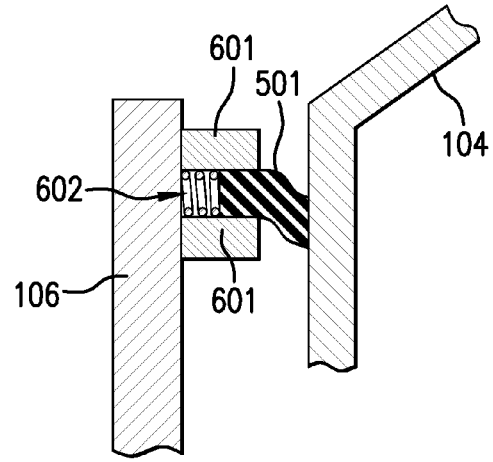
Figure 6C:
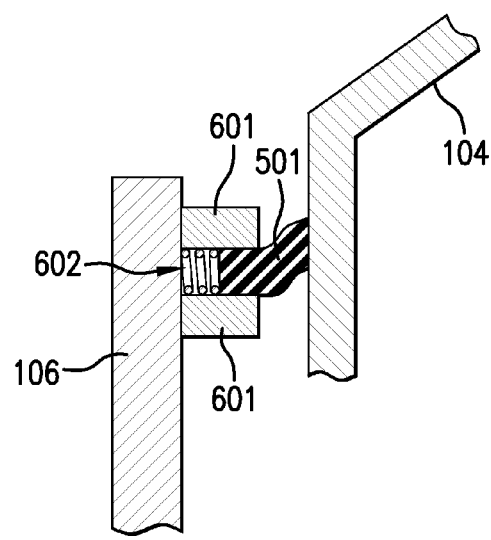

FIGS. 6A-6C show a cross-sectional view of an elastic seal member 501 according to one embodiment. As shown in FIGS. 6A-6C, a pair of seal support plates 601 may extend away from back wall 302 of junction box 106 on each of opposite sides 301 of junction box 106, and, for each pair of seal support plates 601, at least one of the elastic seal members 501 may extend along the bin 103 in parallel with the seal support plates 601. Further, each of the elastic seal members 501 may be biased toward pivoting junction box 106 using one or more springs 602. For example, the one or more springs 602 may be helical coil springs or leaf springs. FIGS. 6A, 6B and 6C show an elastic seal member 501 when auger 304 is in an intermediate position, elevated position and lowered position, respectively.

Figure 6D:
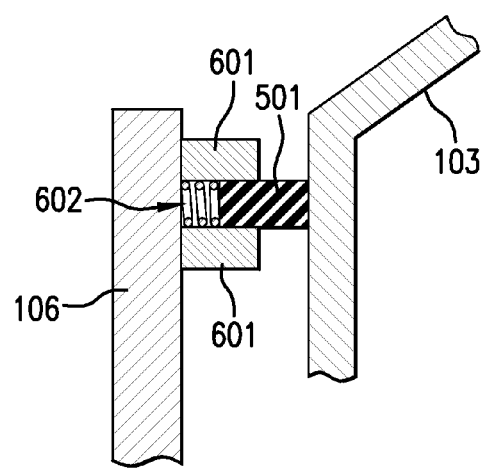
FIG. 6D is a cross-sectional view of a pivoting junction box, bin and hard seal member according to an embodiment of the invention and shows the hard seal member when the auger is in an elevated position.

In an alternative embodiment, the seal members 501 may instead be difficult to bend (e.g., made of a hard rubber or plastic). Accordingly, the hard seal members 501 remain straight and slide against the bin 103 as the junction box 106 pivots. Here, the springs 602 may be biased towards bin 103 and keep the seal members 501 in contact with bin 103. FIG. 6D shows a cross-sectional view of a hard seal member 501 when the auger is in an elevated position in accordance with this alternative embodiment.

In addition, pivoting junction box 106 may include a clean out door 402.

In operation, lift assembly 110 may be used to cause the auger housing 107 to pivot with junction box 106 between a lowered position and an elevated position. Hinge 303 forms a pivot axis about which junction box 106 pivots. The auger housing 107 pivots with junction box 106 about the pivot axis formed by hinge 303 between the lowered and elevated positions. Cart 100 may be pulled by a tractor, and lift assembly 110 may be controlled remotely from a cab of the tractor. Because auger housing 107 may be pivoted between the lowered and elevated positions, the auger housing 107 may be adjusted to the lowered position, to the elevated position and to any position in between. In other words, in some embodiments, an operator is not limited to choosing solely between the elevated position and the lowered position and may also choose any position between the elevated and lowered positions.

Figure 7A:
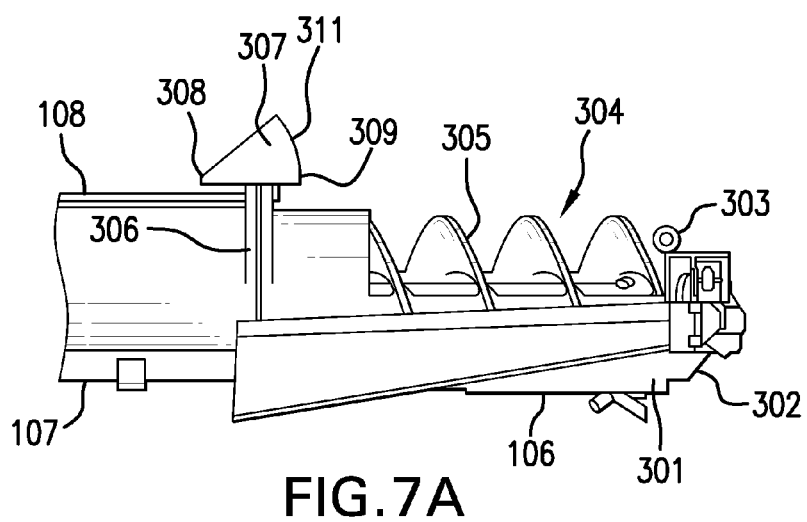
FIGS. 7A and 7B are side views of a pivoting junction box, auger, auger housing and flap of a cart according to an embodiment of the invention and respectively show the relationship of the flap with a flange of the auger housing when the auger is in an elevated position and in a lowered position.
Figure 7B:
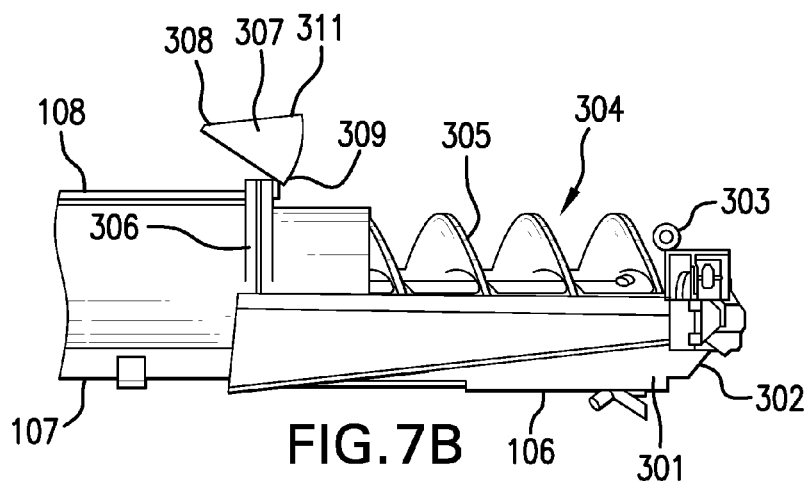

Flap 307, which may include wings 311, guides material in bin 103 into the pivoting junction box 106. As shown in FIGS. 7A and 7B, the upper edge of flange 306 slides against flap 307 as junction box 106 pivots. FIG. 7A shows flap 307 resting on flange 306 when auger housing 107 is in the elevated position. As auger housing 107 and junction box 106 pivot to the lowered position, auger housing 107 moves away from bin 103, and the upper edge of flange 306 slides against flap 307. FIG. 7B shows the relationship between flap 307 and flange 306 when auger housing 107 is in the lowered elevated position. Here, the free bottom edge 309 of flap 307 rests in proximity to the upper edge of flange 306. Still, flap 307 is stiff enough to prevent being pushed over flange 306 by the material from bin 103.

Elastic seal members 501 disposed in the gaps between opposite sides 301 of pivoting junction box 106 and bin 103 maintain a seal between sides 301 and bin 103 when auger 304, auger housing 107 and junction box 106 pivot between a lowered position and an elevated position. By maintaining the seal between sides 301 and bin 103, elastic seal members 501 prevent material, such as grain, in bin 103 from falling through the gaps before entering junction box 106 within the opening of sump 105 at bottom of bin 103.

Pivoting of auger housing 107 and junction box 106 enables the height of a discharge end 111 of auger 304 to be adjusted. Adjusting the height of discharge end 111 of auger 304 enables the height of the discharge end 111 to more closely match the height of a trailer into which material from the storage space of bin 103 is to be unloaded. Accordingly, the gap between discharge end 111 of auger 304 and the trailer is minimized, thereby minimizing loss of material from the storage space of bin 103 due to wind during unloading. Moreover, the adjustable elevation makes it easier for operators to position the chute over the trailer.

In one embodiment, the elevation of discharge end 111 of auger 304 may be adjusted from about 126 inches in a lowered position to about 161 inches in an elevated position. The two heights correspond to common trailer heights. The taller trailer is known as a Super B trailer, and the shorter trailer is a standard North American trailer. By more closely matching the height of the discharge end 111 to the height of the trailer, the gap between them is minimized thereby minimizing grain loss due to wind during the unloading process.

While the invention has been disclosed in detail above, the invention is not intended to be limited to the invention as disclosed. It is evident that those skilled in the art may now make numerous uses and modifications of and departures from the specific embodiments described herein without departing from the inventive concepts.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the invention has been particularly taught and described with reference to certain preferred embodiments, those versed in the art will appreciate that modifications in form and detail may be made without departing from the spirit and scope of the invention. For example, although lift assembly 110 is shown as connected between auger housing 107 and frame 101 in FIGS. 1A, 1B and 2, lift assembly 110 may alternatively be connected between auger housing 107 and bin 103. Also, although auger housing 107 is described as having lower auger housing 108 and upper auger housing 109 pivotable between extended and retracted positions, auger housing 107 may alternatively be a single housing that is not capable of pivoting between extended and retracted positions.

For another example, although the pivoting junction box 106 is shown as having a closed bottom 401 that is flat, closed bottom 401 may alternatively have curved profile that corresponds to the shape of auger 304.

Although auger 304 is illustrated as being a corner auger located at the front left corner of bin 103 of cart 100, auger 304 may alternatively be a corner auger located any corner of bin 103. Further, the invention is also applicable to carts having an auger that is not a corner auger.

These and other modifications of the present invention are intended to be within the scope of the appended claims.

The invention claimed is:

1. A cart comprising:
   a frame supported on a plurality of wheels;
   a bin supported on said frame and including a plurality of bin walls defining a storage space for agricultural material;
   an auger housing coupled to the bin and having an intake end configured to receive agricultural material from the bin, the auger housing having a lower auger housing section and an upper auger housing section, wherein said upper and lower auger housing sections of said auger housing are pivotally connected together such that said upper auger housing section pivots about a first pivot axis between stored and operating positions of said auger housing;
   upper and lower augers extending through said upper and lower auger housing sections, respectively;
   a discharge spout at a top end of said upper auger housing section;
   a lift assembly connected with said auger housing and movable to cause said auger housing in said operating position to pivot about a second pivot axis between a lowered position in which said discharge spout is disposed at a first elevation and an elevated position in which said discharge spout is disposed at a second elevation higher than said first elevation; and
   wherein said first and second pivot axes are oriented at different angles relative to a longitudinal axis of said auger housing,
   wherein said upper auger housing section is configured to be disposed along an outer surface of said bin when said auger housing is in said stored position, and
   wherein said upper auger housing section is movable in only two directions of freedom, about said first and second pivot axes.

2. The cart of claim 1, wherein said upper auger housing section is movable in response to said auger housing pivoting about said second pivot axis.

3. The cart of claim 1, wherein both said upper and lower auger housing sections are movable in response to said auger housing pivoting about said second pivot axis.

4. The cart of claim 1, wherein said first and second pivot axes are spaced from one another along a longitudinal axis of said auger housing.

5. The cart of claim 1, wherein said first and second pivot axes are spaced from one another along a longitudinal axis of said lower auger housing section.

6. The cart of claim 1, wherein said first and second pivot axes are oriented at different angles relative to a longitudinal axis of said lower auger housing section.

7. The cart of claim 1, wherein said second pivot axis is located above a central axis of said lower auger when said auger housing is in both said lowered and elevated positions.

8. The cart of claim 1, wherein said lift assembly further includes a piston connected between the frame and the auger housing and wherein said piston is configured to be controlled remotely from a cab of a tractor.

9. The cart of claim 1, wherein said first pivot axis is above said second pivot axis when said auger housing is in each of said stored, operating, lowered, and elevated positions.

10. A cart comprising:
    a frame supported on a plurality of wheels;
    a bin supported on said frame and including a plurality of bin walls defining a storage space for agricultural material;
    an auger housing coupled to said bin and having an intake end configured to receive agricultural material from said bin, said auger housing having a lower auger housing section and an upper auger housing section, wherein said lower auger housing section is pivotally secured to the upper auger housing section such that the upper auger housing section is pivotable about a first pivot axis between an operating position of said auger housing, in which said upper auger housing section is substantially in alignment with said lower auger housing section, and a stored position of said auger housing, in which said upper auger housing section extends along an outer surface of the bin;

upper and lower augers extending through said upper and lower auger housing sections, respectively;

a discharge spout at a top end of said upper auger housing section;

a lift assembly connected with said auger housing and movable to cause said auger housing in said operating position to pivot about a second pivot axis independent of any movement of said bin and between a lowered position in which said discharge spout is disposed at a first elevation and an elevated position in which said discharge spout is disposed at a second elevation higher than said first elevation;

wherein said first and second pivot axes are oriented at different angles relative to a longitudinal axis of said auger housing, and wherein said upper auger housing section is movable in only two directions of freedom, about said first and second pivot axes.

11. The cart of claim 10, wherein said first and second pivot axes are spaced from one another along a longitudinal axis of said auger housing.

12. The cart of claim 10, wherein said first and second pivot axes are spaced from one another along a longitudinal axis of said lower auger housing section.

13. The cart of claim 10, wherein said first and second pivot axes are oriented at different angles relative to a longitudinal axis of said lower auger housing section.

14. The cart of claim 10, wherein said second pivot axis is located above a central axis of said lower auger when said auger housing is in both said lowered and elevated positions.

15. The cart of claim 10, wherein said lift assembly further includes a piston connected between the frame and the auger housing and wherein said piston is configured to be controlled remotely from a cab of a tractor.

16. The cart of claim 10, wherein said first pivot axis is above said second pivot axis when said auger housing is in each of said stored, operating, lowered, and elevated positions.

17. A cart comprising:
a frame supported on a plurality of wheels;
a bin supported on said frame and including a plurality of bin walls defining a storage space for agricultural material, including a first side wall and a second side wall connected to said first side wall;

an auger housing coupled to said bin at a corner of said bin defined as a region where said first side wall and said second side wall meet and having an intake end configured to receive agricultural material from said bin, said auger housing having a lower auger housing section and an upper auger housing section, wherein said lower auger housing section is pivotally secured to the upper auger housing section such that the upper auger housing section is pivotable about a first pivot axis between an operating position of said auger housing, in which said upper auger housing section is substantially in alignment with said lower auger housing section, and a stored position of said auger housing, in which said upper auger housing section extends along an outer surface of the bin;

upper and lower augers extending through said upper and lower auger housing sections, respectively;

a discharge spout at a top end of said upper auger housing section;

a lift assembly connected with said auger housing and movable to cause said auger housing in said operating position to pivot about a second pivot axis between a lowered position in which said discharge spout is disposed at a first elevation and an elevated position in which said discharge spout is disposed at a second elevation higher than said first elevation; and wherein said first and second pivot axes are oriented at different angles relative to a longitudinal axis of said auger housing.

18. The cart of claim 17, wherein said lift assembly further includes a piston connected between the frame and the auger housing and wherein said piston is configured to be controlled remotely from a cab of a tractor.

19. The cart of claim 17, wherein said first pivot axis is above said second pivot axis when said auger housing is in each of said stored, operating, lowered, and elevated positions.

20. The cart of claim 17, wherein said upper auger housing section is movable in only two directions of freedom, about said first and second pivot axes.

* * * * *